(12) United States Patent
Hirsch et al.

(10) Patent No.: US 8,589,009 B2
(45) Date of Patent: Nov. 19, 2013

(54) METHOD FOR CONTROLLING THE STATE OF CHARGE OF AN ELECTRICAL ENERGY STORE

(75) Inventors: Ronny Hirsch, Munich (DE); Holger Hummel, Munich (DE); Georg Mumelter, Munich (DE)

(73) Assignee: Bayerisch Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/556,854

(22) Filed: Jul. 24, 2012

(65) Prior Publication Data

US 2012/0316719 A1     Dec. 13, 2012

Related U.S. Application Data

(63) Continuation of application No. PCT/EP2010/007551, filed on Dec. 10, 2010.

(30) Foreign Application Priority Data

Jan. 27, 2010    (DE) .......................... 10 2010 005 837

(51) Int. Cl.
    *B60L 9/00*    (2006.01)
(52) U.S. Cl.
    USPC .......................................................... 701/22
(58) Field of Classification Search
    USPC .......................................................... 701/22
    See application file for complete search history.

(56) References Cited

U.S. PATENT DOCUMENTS

| | | | |
|---|---|---|---|
| 6,484,833 B1 | 11/2002 | Chhaya et al. | |
| 6,559,621 B2 * | 5/2003 | Corless et al. | 320/103 |
| 8,010,247 B2 * | 8/2011 | Heap et al. | 701/22 |
| 8,321,082 B2 * | 11/2012 | Ando | 701/22 |
| 2002/0171397 A1 * | 11/2002 | Adrian et al. | 320/119 |
| 2009/0118883 A1 * | 5/2009 | Heap et al. | 701/22 |
| 2009/0250277 A1 | 10/2009 | Grand et al. | |
| 2010/0057281 A1 * | 3/2010 | Lawyer et al. | 701/22 |
| 2010/0152938 A1 * | 6/2010 | Aoki et al. | 701/22 |
| 2010/0198438 A1 * | 8/2010 | Iraha et al. | 701/22 |
| 2011/0078999 A1 * | 4/2011 | Gonze et al. | 60/286 |

FOREIGN PATENT DOCUMENTS

DE    10 2006 001 201 A1    7/2007

OTHER PUBLICATIONS

German Search Report dated Dec. 27, 2010 including partial English-language translation (Nine (9) pages).
German Examination Report dated Dec. 20, 2010 including partial English-language translation (Three (3) pages).
International Search Report dated May 9, 2011 including English-language translation (Four (4) pages).

* cited by examiner

*Primary Examiner* — Hussein A. Elchanti
(74) *Attorney, Agent, or Firm* — Crowell & Moring LLP

(57) ABSTRACT

For controlling the charge state of a battery in a hybrid vehicle having an internal-combustion engine and an electric machine, the battery is operated in a working state-of-charge range falling within a theoretically possible state-of-charge range. In a first sub-range, the battery is charged by the electric machine, the electric machine working as a generator and being engine driven. In a second sub-range, the battery is neither charged nor discharged, the electric machine working as a generator and being driven by the engine and, in the process, supplying only an on-board power supply system of the hybrid vehicle with current. In a third sub-range, the battery is discharged and, in the process, supplies the on-board power supply system with current, the electric machine running along passively. In a fourth sub-range, the battery is discharged and, in the process, supplies current to the electric machine operating as an electric motor.

18 Claims, 1 Drawing Sheet

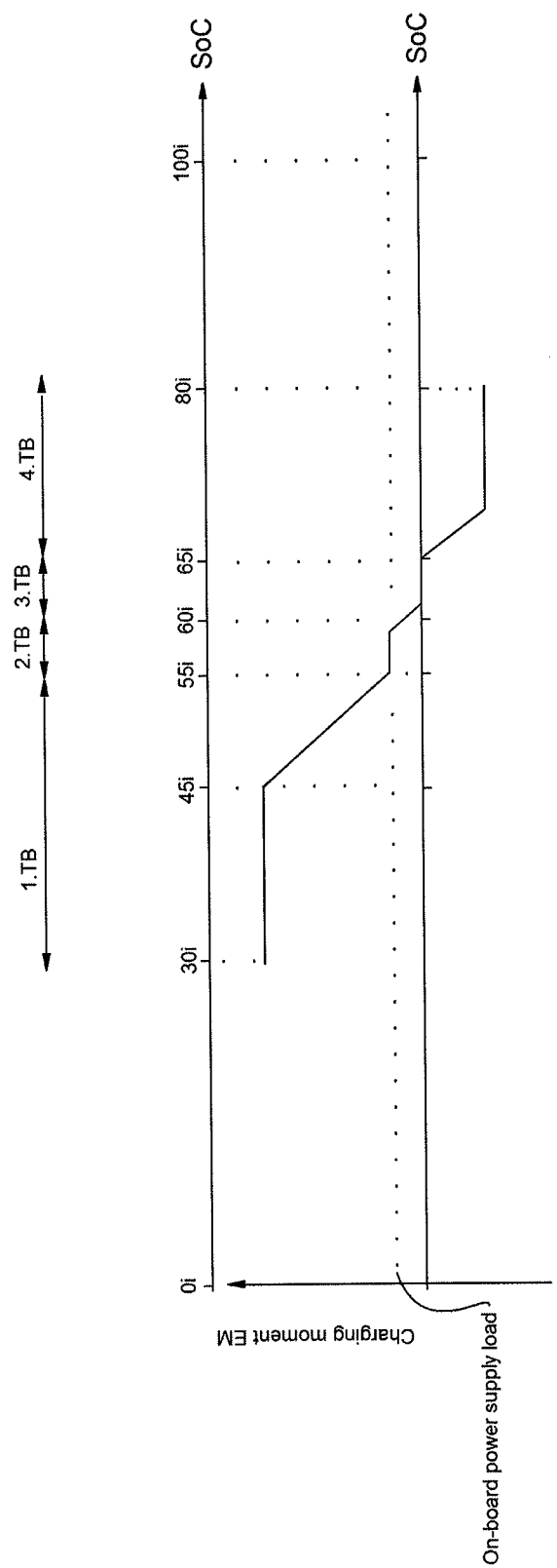

METHOD FOR CONTROLLING THE STATE OF CHARGE OF AN ELECTRICAL ENERGY STORE

CROSS-REFERENCE TO RELATED APPLICATIONS

This application is a continuation of PCT International Application No. PCT/EP2010/007551, filed Dec. 10, 2010, which claims priority under 35 U.S.C. §119 from German Patent Application No. DE 10 2010 005 837.8, filed Jan. 27, 2010, the entire disclosures of which are herein expressly incorporated by reference.

BACKGROUND AND SUMMARY OF THE INVENTION

The present invention relates to a method of controlling the state of charge of an electric energy accumulator (i.e. an energy store), particularly a battery, of a hybrid vehicle, which has an internal-combustion engine and an electric machine, the battery being operated in a working state-of-charge range (30%-80%), which is completely within the theoretically possible state-of-charge range (0%-100%) of the battery.

So-called hybrid vehicles are characterized in that, in the coasting operation of the vehicle, kinetic energy is recuperated by way of an electric machine, i.e., converted to electric energy and stored in an energy accumulator. In driving phases of the vehicle, the stored energy can be used for operating the electric machine as an electric motor and/or for supplying electrical energy to the diverse electrical vehicle systems.

It is an object of the invention to control the state of charge (SoC) of the electric energy accumulator such that a long useful life of the energy accumulator is obtained.

This and other objects are achieved by a method of controlling the state of charge of an electric energy accumulator, particularly a battery, of a hybrid vehicle that has an internal-combustion engine and an electric machine. The electric energy accumulator is operated in a "working state-of-charge range" that is within the theoretically possible state-of-charge range of the energy accumulator. Theoretically, the energy accumulator can take up a state of charge in the range of between 0% (energy accumulator is empty) and 100% (energy accumulator is fully charged). Tests have shown that, if possible, the state of charge of the energy accumulator in operation should not be below a predefined lower limit and, if possible, also not above a predefined upper limit because this would otherwise considerably decrease the useful life of the energy accumulator. The "working state-of-charge range" may, for example, be defined as the state-of-charge range between 30% and 80% of the maximal state of charge.

It is an aspect of the invention that the working state-of-charge range is functionally divided into four sub-ranges, which can be characterized as follows.

In a first sub-range (SoC is low) of the working state-of charge range, the battery is charged by the electric machine of the hybrid vehicle. The electric machine therefore works as a generator and, in the process, is driven by the internal-combustion engine of the hybrid vehicle.

In a second sub-range (SoC low optimum) of the working state-of-charge range, the battery is neither charged nor discharged. Also in this sub-range, the electric machine operates as a generator and is driven by the internal-combustion engine. However, the electric power generated by the electric machine is just high enough for supplying the on-board power system of the hybrid vehicle with current.

In a third sub-range (SoC upper optimum) of the working state-of-charge-range, the battery is discharged, in which case the battery supplies the on-board power system of the hybrid vehicle with current. In the third sub-range of the working state-of-charge range, the electric machine is running along passively. "Running along passively" means that it neither receives electric power, nor delivers electric power. In the third sub-range, the recuperation energy is utilized more efficiently in that the existing recuperated stored energy is utilized for supplying the electrical consuming devices present in the vehicle.

In a fourth sub-range (SoC is high) of the working state-of-charge range, the battery is being discharged. In this fourth sub-range, the electric machine of the hybrid vehicle operates as an electric motor and is supplied with current by the battery.

According to a further aspect of the invention, the working state-of-charge range has a lower limit which is in the range of between 25% and 35%, particularly at approximately 30% of the maximal state of charge. The upper limit of the state of charge range may be in the range of between 75% and 85%, particularly at approximately 80% of the maximal state of charge.

The first sub-range of the working state-of-charge range is defined by the lower limit of the working state-of-charge range and a first sub-range limit. The first sub-range limit may, for example, be in the range of between 50% and 55% of the maximal state of charge of the energy accumulator. The first sub-range may therefore, for example, be between 30% and 55% of the maximal state of charge of the energy accumulator.

The second sub-range of the working state-of-charge range is defined by the first sub-range limit and a second sub-range limit, which may, for example, be at 60%.

The third sub-range of the working state-of-charge range is defined by the second sub-range limit and a third sub-range limit which may, for example, be at 65% of the maximal state of charge of the energy accumulator.

The fourth sub-range of the working state-of-charge range is defined by the third sub-range limit and the upper limit of the working state-of-charge range. The fourth sub-range may therefore, for example, be between 65% and 80% of the maximal state-of-charge of the energy accumulator. Therefore, in the first sub-range a "load point elevation" of the internal-combustion engine takes place, which means that the electric machine is operating as a generator and represents an additional load for the internal-combustion engine. In contrast, the fourth sub-range is characterized by a load point drop, which means that the electric machine is operating as an electric motor and aids the vehicle drive or the internal-combustion engine.

According to another aspect of the invention, the transitions between the individual sub-ranges of the working state-of-charge range are constant (in a mathematical sense). They can, for example, be defined by ramp functions. In other words, the charging moment of the electric machine has a constant course over the state of charge. However, the course must not necessarily be constantly differentiable. The deflection of the charging moment of the electric machine after the state of charge may rather have an unsteady course, for example, a course that is constant in sections.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a diagram of the charging moment versus the state of charge illustrating an exemplary method according to the invention.

DETAILED DESCRIPTION OF THE DRAWING

The diagram illustrated in FIG. 1 explains an exemplary method according to the invention of controlling the state of charge. The state of charge (SoC) is entered on the abscissa. The theoretically possible state-of-charge range of a battery is between 0 and 100%. Normally, a working state-of-charge range is defined which fades out the lowest and the highest range of the theoretically possible state-of-charge range. The working state-of-charge range may, for example, be between 30% and 80%.

The diagram shows that the working state-of-charge range is subdivided into four sub-ranges $1^{st}$ TB, $2^{nd}$ TB, $3^{rd}$ TB and $4^{th}$ TB. In the embodiment illustrated here, the first sub-range ($1^{st}$ TB) is between the lower limit (30%) of the working state-of-charge range and a first sub-range limit, which here is set at a value of 55%. In the first sub-range ($1^{st}$ TB), the electric machine of the hybrid vehicle operates as a generator, which is illustrated by the fact that the charging moment of the electric machine assumes a positive value. In this case, the electric machine is driven by the internal-combustion engine of the hybrid vehicle. In an upper state-of-charge range of the first sub-range, which is defined here by the range of between 45% and 55%, a "ramp function" is provided; i.e., the charging moment of the electric machine is gradually, for example, linearly, moved downward with an increasing state of charge of the battery.

In the second sub-range ($2^{nd}$ TB) of the working state of charge, the electric machine also works as a generator, in which case, it continues to be driven by the internal-combustion engine. However, in the second sub-range of the working state-of-charge range, the electric machine essentially only still generates the onboard power supply load, i.e., the power that is required for supplying the on-board power supply system of the hybrid vehicle. The "transition range" between the second sub-range ($2^{nd}$ TB) and the third sub-range ($3^{rd}$ TB) is also formed by a transition function. Here also, this transition function is chosen as a ramp function. In the third sub-range ($3^{rd}$ TB) of the working state-of-charge range, the battery supplies the on-board power supply system. In this case, the electric machine runs along essentially passively; i.e., it neither consumes power nor delivers power.

The advantage obtained in comparison with conventional controls or the $2^{nd}$ sub-range is a more efficient utilization of the recuperated energy. In this range, an increase of the state of charge occurs approximately only by recuperation. As a result of the control strategy in the $3^{rd}$ sub-range, it is avoided that the recuperated energy is immediately within a short time by way of a load point drop at the electric machine converted to mechanical energy, while the supply of the on-board power supply system over a longer period of time becomes necessary again by way of part of the internal-combustion engine power and the electric machine. This results in a more consumption-efficient utilization of the recuperated energy proportional to the factor 1/(2*relative efficiency E-machine).

In the fourth sub-range ($4^{th}$ TB) of the working stage-of-charge range, the battery is discharged. In this case, the electric machine works as an electric motor and is supplied with current by the battery. In a transition range from the third sub-range to the fourth sub-range, a transition function or ramp function may also be provided. Since the electric machine works here as an electric motor, the charging moment of the electric machine is correspondingly negative. This is also called a load point drop of the internal-combustion engine because the electric machine aids the internal-combustion engine with respect to the torque provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a state of charge of an electric energy accumulator in a hybrid vehicle having an internal-combustion engine and an electric machine, the method comprising the acts of:
   in a first sub-range of a working state-of-charge range being within a theoretically possible state-of-charge range of the electric energy accumulator, charging the electric energy accumulator by the electric machine, the electric machine operating as a generator and being driven by the internal-combustion engine;
   in a second sub-range of the working state-of-charge range, neither charging nor discharging the electric energy accumulator, the electric machine operating as a generator and being driven by the internal-combustion engine in order to supply only an on-board power supply system of the hybrid vehicle with current, wherein the on-board power supply system comprises electrical consuming devices present in the vehicle;
   in a third sub-range of the working state-of-charge range, discharging the electric energy accumulator in order to supply only the on-board power supply system with current, the electric machine running along passively by neither receiving electric power nor delivering electric power; and
   in a fourth sub-range of the working state-of-charge range, discharging the electric energy accumulator in order to supply the electric machine with current, the electric machine operating as an electric motor to aid the vehicle drive or the internal-combustion engine.

2. The method according to claim 1, wherein there the working state-of-charge range is between 30% and 80% of the theoretically possible state-of-charge range of 0% to 100%.

3. The method according to claim 2, wherein the electric energy accumulator is a battery of the hybrid vehicle.

4. The method according to claim 1, wherein the working state-of-charge range has a lower limit, the lower limit being in a range of between 25% and 35% of a maximal state of charge of the electric energy accumulator.

5. The method according to claim 4, wherein the lower limit is approximately 30% of the maximal state of charge.

6. The method according to claim 1, wherein the working state-of-charge range has an upper limit, the upper limit being in a range of between 75% and 85% of a maximal state of charge of the electric energy accumulator.

7. The method according to claim 6, wherein the upper limit is approximately 80% of the maximal state of charge.

8. The method according to claim 1, wherein the first sub-range of the working state-of-charge range is defined by a lower limit and a first sub-range limit, the lower limit being approximately 30% of a maximal state-of-charge of the electric energy accumulator.

9. The method according to claim 8, wherein the first sub-range limit is in a range of between 50% and 55% of the maximal state of charge.

10. The method according to claim 8, wherein the second sub-range of the working state-of-charge is defined by the first sub-range limit and a second sub-range limit.

11. The method according to claim 10, wherein the second sub-range limit is at approximately 60% of the maximal state of charge.

12. The method according to claim 10, wherein the third sub-range of the working state-of-charge range is defined by the second sub-range limit and a third sub-range limit.

13. The method according to claim 12, wherein the third sub-range limit is at approximately 65% of the maximal state of charge.

14. The method according to claim 12, wherein the fourth sub-range of the working state-of-charge is defined by the third sub-range limit and an upper limit of the working state-of-charge range.

15. The method according to claim 14, wherein the upper limit of the working state-of-charge range is at approximately 80% of the maximal state of charge.

16. The method according to claim 1, wherein a function of a charging moment of the electric machine has a constant course over the state-of-charge.

17. The method according to claim 16, wherein the course is not constantly differentiable.

18. The method according to claim 17, wherein the course is constant in one or more sections over the state of charge.

* * * * *